(12) United States Patent
Venkataramani et al.

(10) Patent No.: US 11,016,840 B2
(45) Date of Patent: May 25, 2021

(54) LOW-OVERHEAD ERROR PREDICTION AND PREEMPTION IN DEEP NEURAL NETWORK USING APRIORI NETWORK STATISTICS

(71) Applicant: INTERNATIONAL BUSINESS MACHINES CORPORATION, Armonk, NY (US)

(72) Inventors: Swagath Venkataramani, Yonkers, NY (US); Schuyler Eldridge, Ossining, NY (US); Karthik V. Swaminathan, Mount Kisco, NY (US); Alper Buyuktosunoglu, White Plains, NY (US); Pradip Bose, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 16/262,832

(22) Filed: Jan. 30, 2019

(65) Prior Publication Data
US 2020/0241954 A1 Jul. 30, 2020

(51) Int. Cl.
*G06F 11/00* (2006.01)
*G06F 11/07* (2006.01)
*G06N 3/04* (2006.01)
*G06N 3/08* (2006.01)

(52) U.S. Cl.
CPC ........ *G06F 11/0793* (2013.01); *G06F 11/076* (2013.01); *G06F 11/0736* (2013.01); *G06N 3/04* (2013.01); *G06N 3/08* (2013.01)

(58) Field of Classification Search
CPC .......... G06N 3/04; G06N 3/08; G06F 11/076
See application file for complete search history.

(56) References Cited

U.S. PATENT DOCUMENTS

| | | | |
|---|---|---|---|
| 6,725,163 B1* | 4/2004 | Trappe | G01V 1/28 702/14 |
| 9,681,250 B2 | 6/2017 | Luo et al. | |
| 2015/0269483 A1* | 9/2015 | Nishitani | G06N 3/084 706/25 |

(Continued)

OTHER PUBLICATIONS

Addo, P. M. et al., "Credit Risks Analysis Using Machine and Deep Learning Models", Risks (2018); vol. 6:38; pp. 1-20.

(Continued)

*Primary Examiner* — Jonathan D Gibson
(74) *Attorney, Agent, or Firm* — Intelletek Law Group, PLLC; Gabriel Daniel, Esq.

(57) ABSTRACT

A coarse error correction system for detecting, predicting, and correcting errors in neural networks is provided. The coarse error correction system receives a first set of statistics that are computed from values collected from a neural network during a training phase of the neural network. The coarse error correction system computes a second set of statistics based on values collected from the neural network during a run-time phase of the neural network. The coarse error correction system detects an error in the neural network during the run-time phase of the neural network by comparing the first set of statistics with the second set of statistics. The coarse error correction system increases a voltage setting to the neural network based on the detected error.

15 Claims, 8 Drawing Sheets

(56) References Cited

U.S. PATENT DOCUMENTS

| | | | |
|---|---|---|---|
| 2017/0039456 A1 | 2/2017 | Saberian et al. | |
| 2017/0293736 A1 | 10/2017 | Kramer et al. | |
| 2019/0228285 A1* | 7/2019 | Zhang | G06N 3/063 |
| 2019/0235940 A1* | 8/2019 | Kegel | G06K 9/6271 |
| 2019/0333199 A1* | 10/2019 | Ozcan | G06N 3/0481 |
| 2019/0385047 A1* | 12/2019 | Lei | G06N 3/08 |
| 2019/0385695 A1* | 12/2019 | Jeong | G11C 29/50 |
| 2020/0050920 A1* | 2/2020 | Idgunji | G06F 1/329 |
| 2020/0119556 A1* | 4/2020 | Shi | G06N 3/0472 |
| 2020/0210831 A1* | 7/2020 | Zhang | G06F 12/02 |
| 2020/0241954 A1* | 7/2020 | Venkataramani | G06F 11/0736 |
| 2020/0264249 A1* | 8/2020 | Tayli | G01R 33/30 |
| 2020/0272893 A1* | 8/2020 | Danial | G06N 3/084 |

OTHER PUBLICATIONS

Pan, S. et al., "Long-time Predictive Modeling of Nonlinear Dynamical Systems Using Neural Networks", arXiv:1805.12547v2 [stat.ML] Jun. 5, 2018, pp. 1-29.

Anonymous, "Determining Validity of a Point of Interest Based on Existing Data", IP.com (2017); 33 pgs.

Anonymous, "Extracting Pointing of Interest Information form Query Logs", IP.com (2017); 33 pgs.

Anonymous, "Weighting Knowledge Sources to Facilitate User Input", IP.com (2018); 39 pgs.

\* cited by examiner

LOW-OVERHEAD ERROR PREDICTION AND PREEMPTION IN DEEP NEURAL NETWORK USING APRIORI NETWORK STATISTICS

STATEMENT REGARDING FEDERALLY SPONSORED RESEARCH OR DEVELOPMENT

This application was made with government support under HR0011-13-C-0022 awarded by Defense Advanced Research Projects Agency (DARPA). The government has certain rights to this invention.

BACKGROUND

Technical Field

The present disclosure generally relates to computation by neural networks.

Description of the Related Art

The field of Artificial Intelligence (AI) has witnessed a quintessential growth in recent years with the advent of Deep Neural Networks (DNNs) that have achieved state-of-the-art classification accuracies on many recognition tasks involving images, videos, text and natural language. However, the computational and storage demands imposed by these large-scale networks have been the primary bottleneck to their ubiquitous adoption. A scenario that exemplifies this computational challenge is low-power inference, where DNN models are executed on deeply-embedded wearable and IoT devices that have stringent energy and area constraints.

SUMMARY

Some embodiments of the disclosure provide a coarse error correction system for neural networks. The coarse error correction system receives a first set of statistics that are computed from values collected from a neural network during a training phase of the neural network. The coarse error correction system computes a second set of statistics based on values collected from the neural network during a run-time phase of the neural network. The first set of statistics includes an average saturation rate of neurons in the neural network during the training phase and the second set of statistics includes an average saturation rate of neurons in the neural network during the run-time phase. The coarse error correction system detects an error in the neural network during the run-time phase of the neural network by comparing the first set of statistics with the second set of statistics. The coarse error correction system increases a voltage setting to the neural network based on the detected error. In some embodiments, the coarse error correction system predicts an error at a section of the neural network based on the set of statistics. The coarse error correction system preempts the error at the section of the neural network during a run-time phase of the neural network by increasing the voltage setting for the section of the neural network.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

One approach to implementing a Deep Neural Network (DNN) with stringent energy and area constraints is to reduce voltage at hardware circuits implementing the DNN. Hardware circuits operating at reduced voltage consumes less power, but with increased likelihood of transient errors. Error checkers can be used to detect and correct transient errors in hardware during application runtime. A common approach to implementing error checkers is to replicate computation by redundant hardware or repeat execution and to compare the result of the replicated computation at every clock cycle. This approach has very high overhead.

DNNs have significant algorithmic resilience such that the networks can produce correct results even in the presence of errors. Some embodiments of the disclosure provide a system that leverages the resilience of DNNs to provide a coarse-grain error detector and/or error predictor for DNNs. The system uses statistical information collected from a DNN during a training phase of the DNN to detect error or predict error during a run-time phase of the DNN.

Figures 1A, 1B:
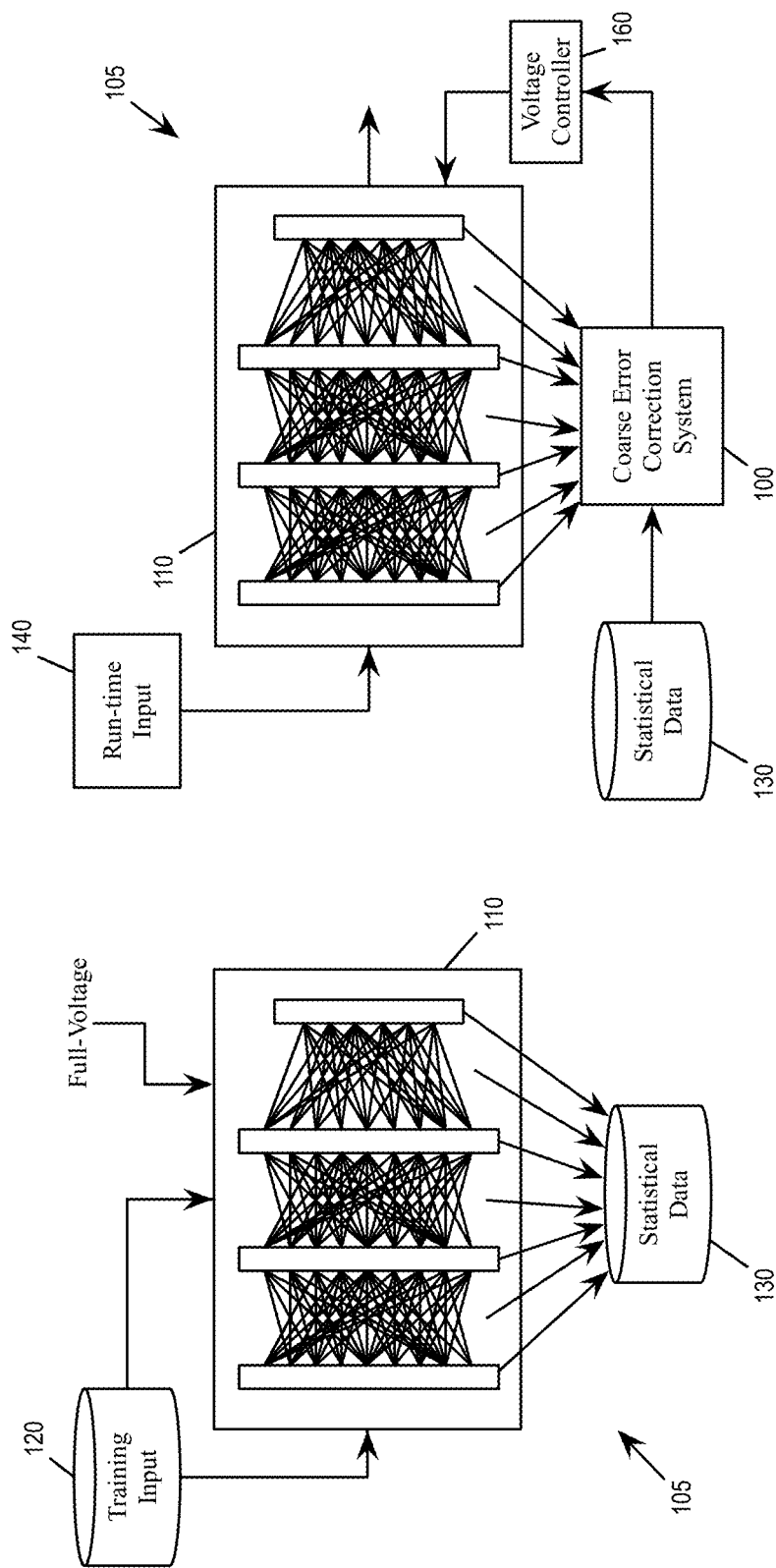
FIG. 1a-b illustrates a coarse error correction system for a Deep Neural Network (DNN).

FIG. 1a-b illustrates a coarse error correction system 100 for a DNN 110, consistent with illustrative embodiments. The coarse error correction system 100 uses statistical information collected from the DNN 110 during the DNN's training phase to detect error or predict error during a run-time phase of the DNN. In some embodiments, the DNN 110 and the coarse error correction system 100 are in a same physical device 105.

FIG. 1a illustrates a training phase of the DNN 110. The DNN 110 is trained by a training system that may include the coarse error correction system 100. While the training system applies a set of training input 120 to the DNN 110, various components of the DNN 110 are monitored to produce a set of statistical data 130. The DNN 110 is operating under a full voltage level that is not expected to cause significant transient errors in the DNN.

FIG. 1b illustrates a run-time phase of the DNN 110. The DNN 110 is trained and is performing computation tasks based on run-time input 140, which includes stored stimuli or stimuli received from a source external to the physical device 105. The DNN 110 may be operating in a reduced voltage condition and may have transient errors as a result of the reduced voltage. The coarse error correction system may control the voltage applied to the DNN by adjusting a voltage controller 160.

The coarse error correction system 100 uses the set of statistical data 130 that was collected during the training to detect run-time errors in the DNN 110 or to predict run-time errors in the DNN 110. The coarse error correction system 100 may monitor the DNN 110 and compare the monitored results with the set of statistical data 130 to detect transient errors in the DNN 110. The error detector/predictor 150 may use the set of statistical data 130 to predict when and where transient errors may occur in DNN 110. Based on the detected or predicted errors, the coarse error correction system 100 may report the error or change the voltage setting to the DNN 110 to preempt the error (e.g., by increasing the voltage setting to eliminate transient errors).

Figure 2:
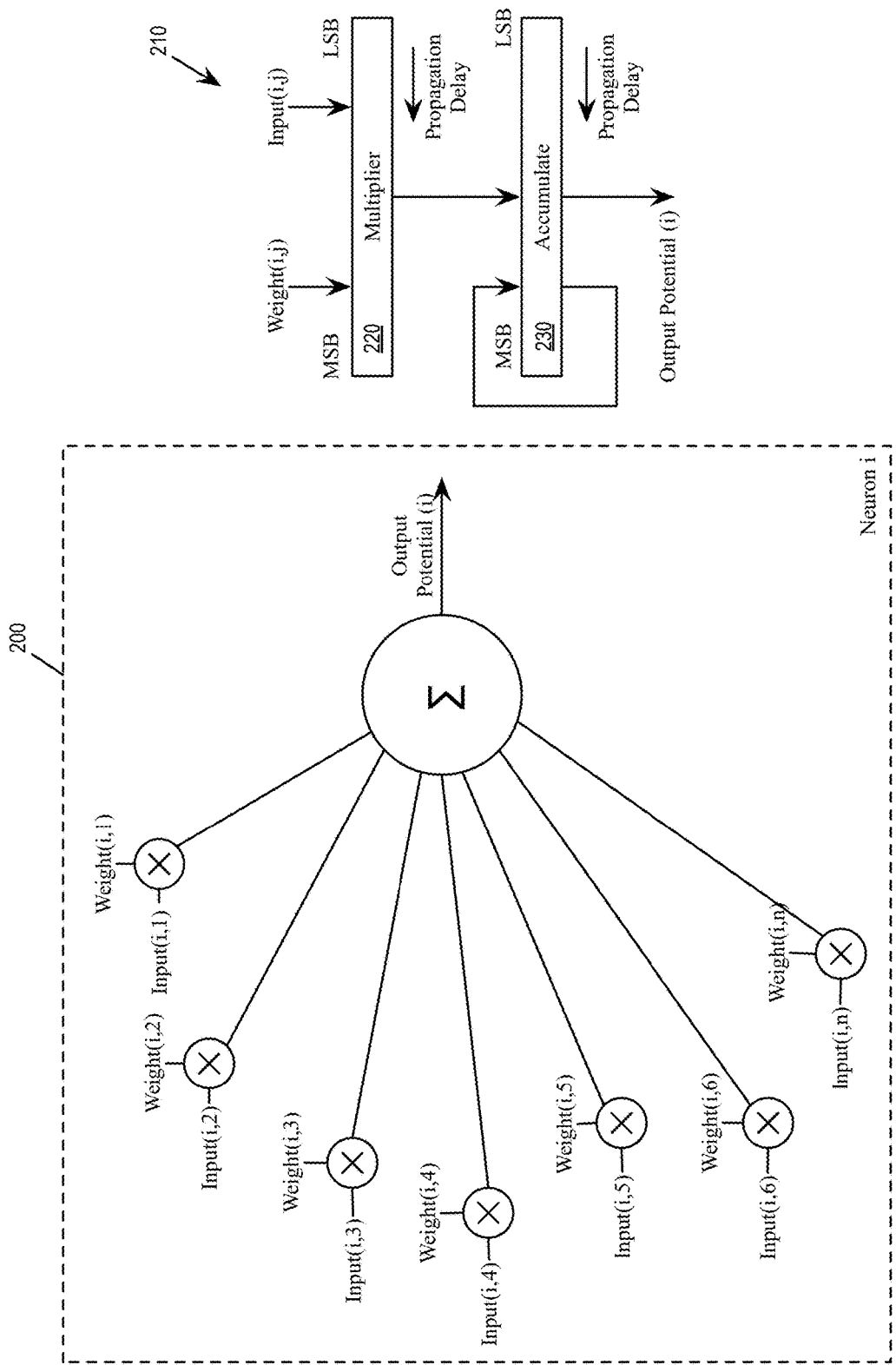
FIG. 2 illustrates an example neuron in the DNN and an example neural processing element that implements the neuron.

FIG. 2 illustrates an example neuron 200 in the DNN 110 and an example neural processing element (NPE) 210 that implements the neuron 200. As illustrated, the example neuron 200 has n input connections, and each input connection has a corresponding weight. The value of each input connection is multiplied with the value of its corresponding weight, and the products are summed to produce an output value, which is also referred to as the neuron's output potential. The NPE 210 is a multiply-accumulate processing element. The NPE 210 includes a multiplier 220 for multiplying values of input connections with values of weights. The NPE 210 also includes an accumulator 230 for summing the products produced by the multiplier 220.

The NPE 210 operates correctly if the carry signals are able to propagate through the multiplier 220 and the accumulator 230 within the allowed time. Conversely, the NPE 210 may produce transient errors if the carry signals are not able to propagate through the multiplier 220 and the accumulator 230 within the allowed time. When the values being multiplied and added are small, the number of bits for the carry signal to propagate through is also small. When the values being multiplied and added are large, the number of bits for the carry signal to propagate through is also large. Under low voltage conditions, signals in the NPE circuits propagate slower. Consequently, a neuron processing large values is more likely to have transient errors under low voltage conditions because carry signals may not be able to propagate through the bits in time.

Figure 3:
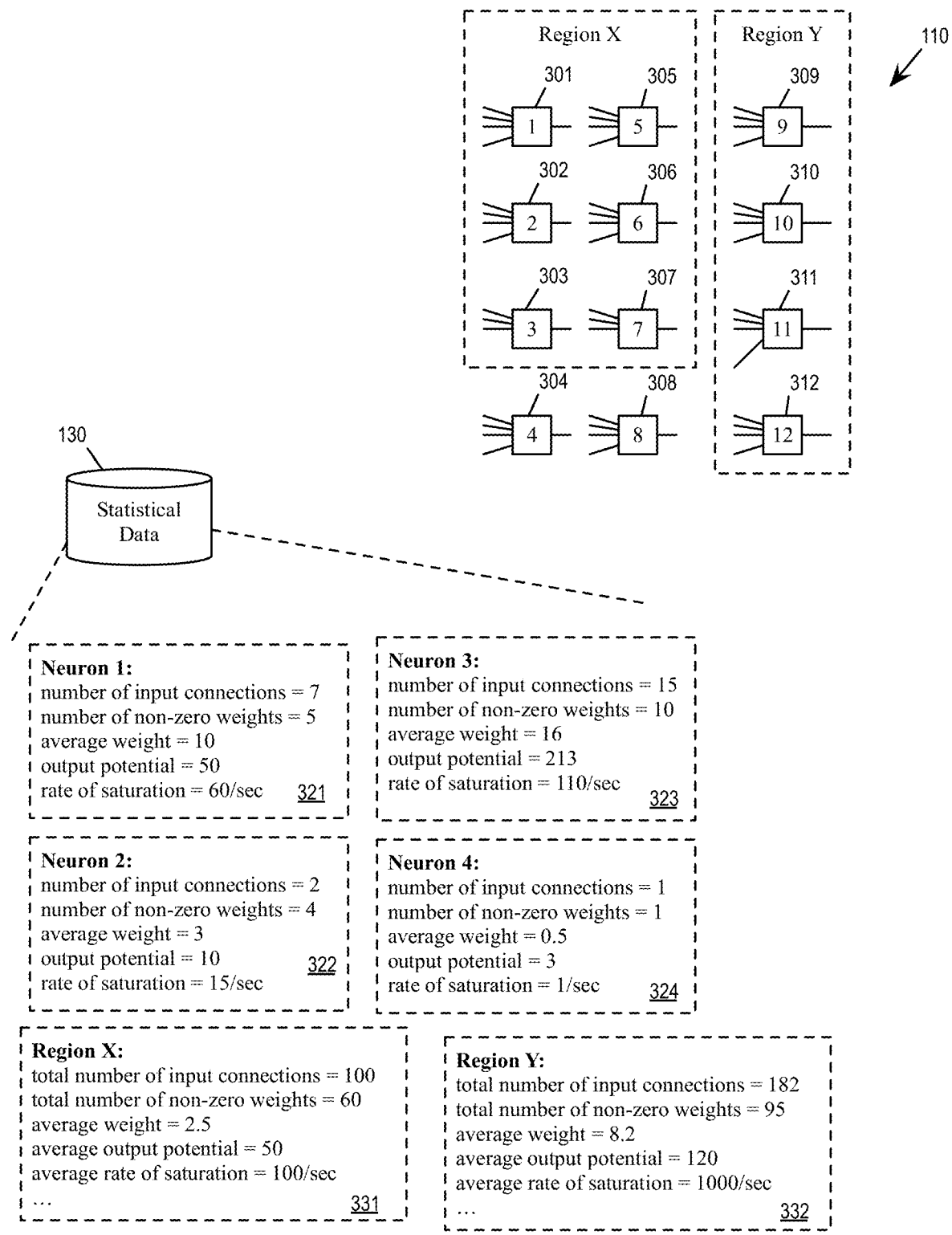
FIG. 3 illustrates example statistical data that is used by the coarse error correction system to predict or detect errors in the DNN.

FIG. 3 illustrates example statistical data 130 that is used by the coarse error correction system 100 to predict or detect errors in the DNN 110. As illustrated, the DNN 110 includes neurons 301-312 (labeled as neurons 1 through 12). During the training phase, the neurons 301-312 are monitored and the monitoring results are captured as neuron metrics. The figure illustrates example neuron metrics 321-324, respectively, for neurons 301-304 (neurons 1 through 4).

The captured neuron metrics for a neuron includes structural information related to the neuron, such as the number of input connections of the neuron. The captured neuron metrics include results of the training of the neuron, such as the number of non-zero inputs in the neuron, the number of non-zero weights in the neuron, the average weight of the neuron, and the output potential of the neuron. The captured neuron metrics include statistics that reflect the behavior of the neuron during the training phase, such as the rate of saturation of the neuron. Some of the statistical data are dynamic values that reflect the state of the neural network at an instant or interval in time. For example, the number of non-zero inputs and the number of non-zero weights are sampled at different time instances or time intervals. These statistical data are used by the coarse error correction system 100 to dynamically detect errors in the DNN 110 during the run-time phase.

The neuron metrics of individual neurons may be stored as part of the statistical data 130. The training system or the coarse error correction system 100 may use the neuron metrics of the individual neurons to derive additional statistics for the DNN 110. The derived statistics may be for the entire DNN 110 or for a subset of the DNN 110. In the example illustrated in FIG. 3, the statistical data 130 includes derived statistics 331 for a region X and derived statistics 332 for a region Y of the DNN 110. The region X includes neurons 301-303 and 305-307. The region 332 includes neurons 309-312. The derived statistics for a region include tallies and/or averages derived from the neuron metrics of the neurons that fall within the region, such as the total number of input connections, the total number of non-zero inputs, the total number of non-zero weights, the average weight of the neurons, the average output potential, and the average rate of saturation, etc.

During the run-time phase of the DNN 110, the coarse error correction system 100 may use the statistical data 130 to detect the presence of transient errors in the DNN. In some embodiments, the coarse error correction system 100 compares the rate of occurrence of a particular type of event in the DNN (e.g., neuron saturation rate) during the training phase with the rate of occurrence of the same type of event in the DNN during the run-time phase. An error is detected when the rate of occurrence during the run-time phase differs from the rate of occurrence during the training phase by greater than a predefined threshold.

Figure 4:
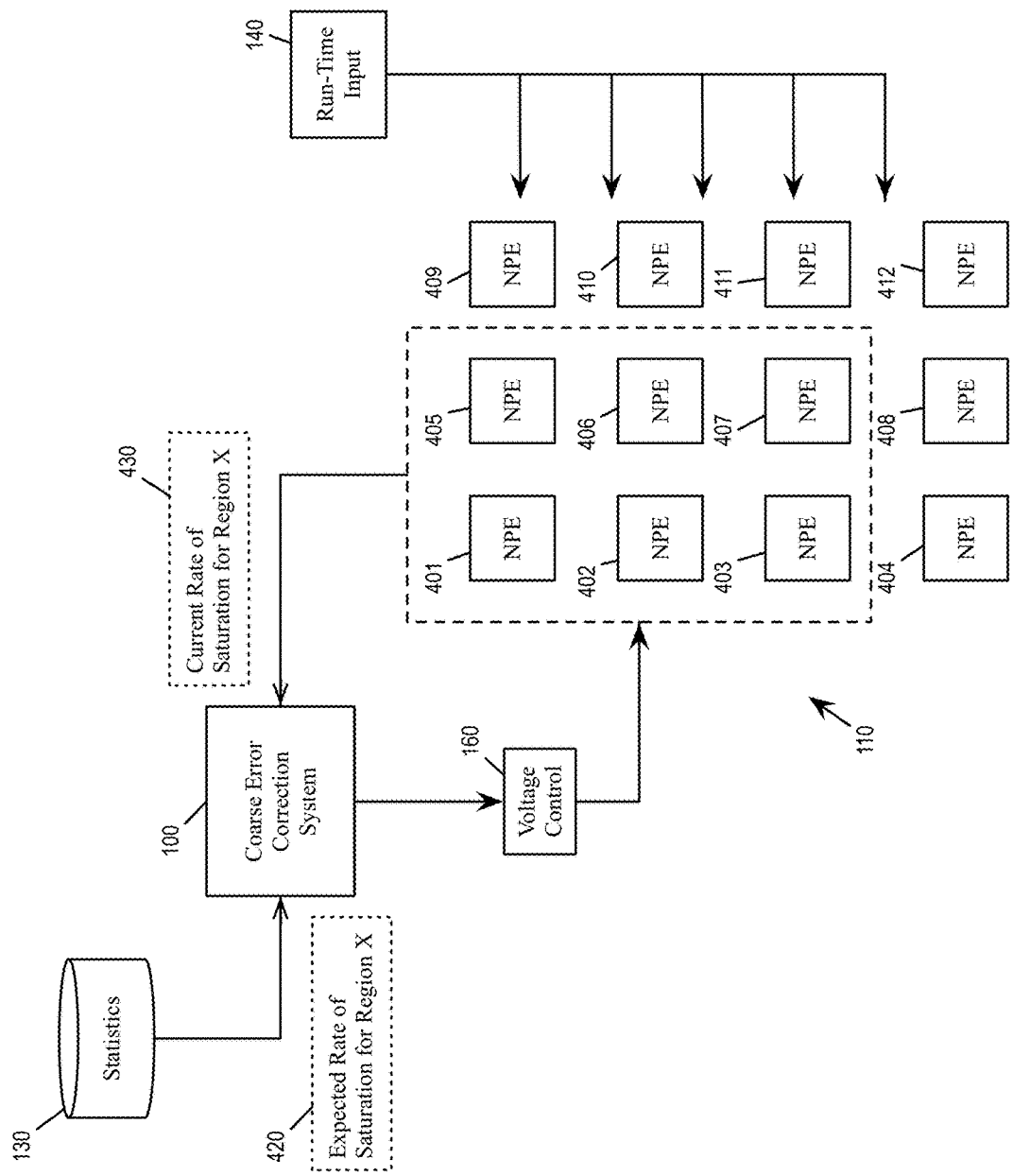
FIG. 4 illustrates the coarse error correction system using the statistical data to detect the presence of transient errors in the DNN during the run-time phase.

FIG. 4 illustrates the coarse error correction system 100 using the statistical data 130 to detect the presence of transient errors in the DNN 110 during the run-time phase. The neurons of DNN 110 are implemented by a set of NPEs 401-412, with NPEs 401-403 and 405-407 performing the computations of neurons in region X of the DNN 110. The DNN performs run-time tasks (e.g., classification) based on run-time input 140.

The coarse error correction system 100 receives the statistical data 130, which includes neuron metrics of individual neurons and statistics derived from the neuron metrics. The received statistical data 130 includes an expected rate of saturation 420 for neurons in region X. The coarse error correction system 100 also monitors NPEs 401-412 and determines a run-time rate of saturation 430 for region X based on metrics monitored from NPEs 401-403 and 405-407. If the difference between the expected rate of saturation 420 and the run-time rate of saturation 430 is greater than a certain threshold, the coarse error correction system 100 may report an error or perform error correction. In some embodiments, the coarse error correction system 100 uses the difference between the expected rate of saturation 420 and the run-time rate of saturation 430 to determine an adjustment of voltage settings to the NPEs (by controlling the voltage control 160), since the difference can be indicative of a transient error caused by low voltage conditions. In some embodiments, a counter is used to count a number of neurons that saturate over an interval of time when determining the average rate of saturation.

In some embodiments, the coarse error correction system 100 may use the statistical data 130 to predict the presence of transient errors in the DNN in low voltage conditions. As mentioned, neurons having to process larger values are more likely to have transient errors in low voltage conditions. In some embodiments, the coarse error correction system 100 uses the statistical data 130 to identify neurons or regions of neurons that are more likely to process larger values and therefore more likely to have transient errors in low voltage conditions.

Figure 5:
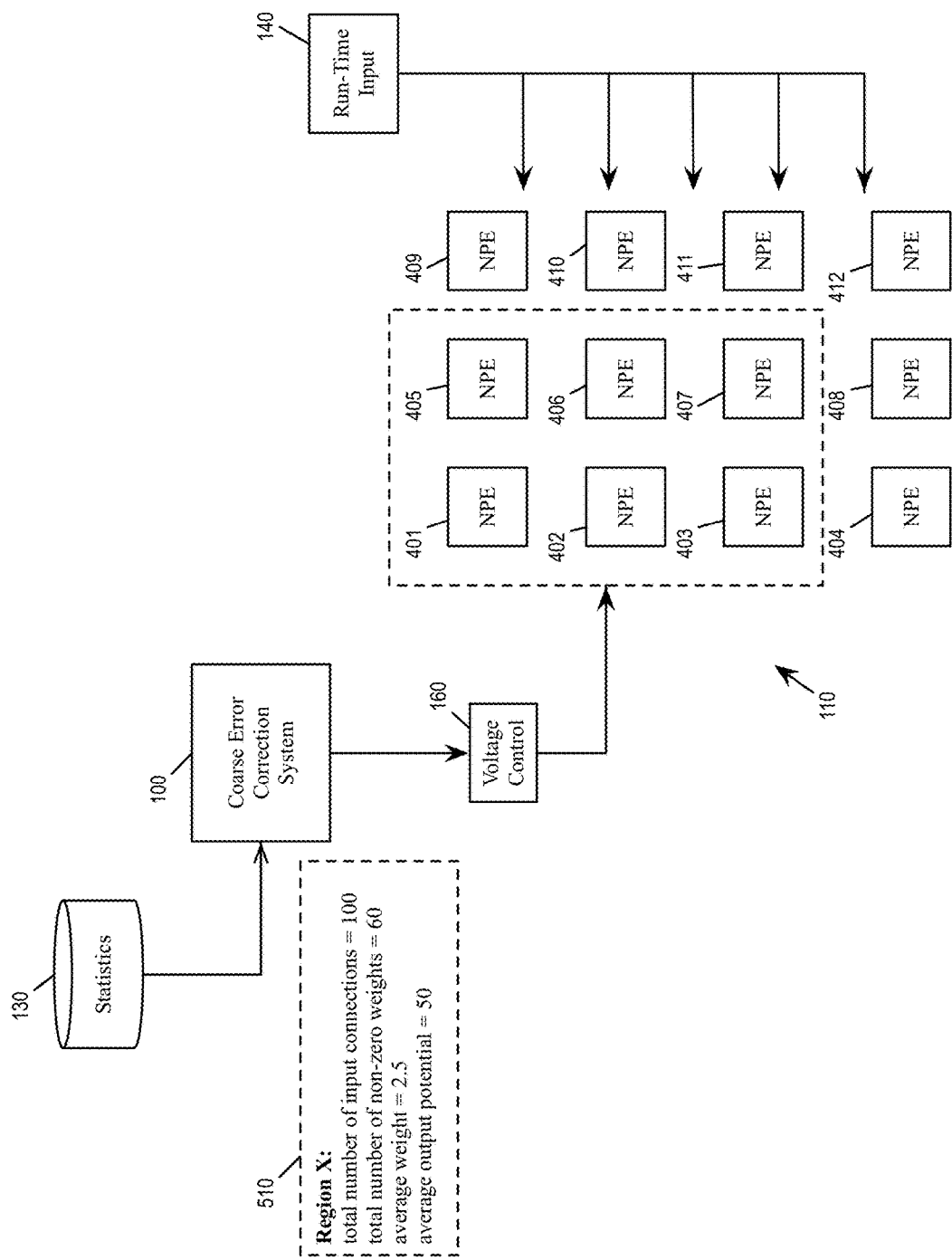
FIG. 5 illustrates the coarse error correction system using the statistical data to predict the presence of transient errors in the DNN during the run-time phase.

FIG. 5 illustrates the coarse error correction system 100 using the statistical data 130 to predict the presence of transient errors in the DNN 110 during the run-time phase. The neurons of DNN 110 are implemented by the set of NPEs 401-412, with NPEs 401-403 and 405-407 performing the computations of neurons in region X of the DNN 110. The DNN is performing run-time tasks (e.g., classification) based on run-time input 140.

The coarse error correction system 100 receives the statistical data 130, which includes a set of neuron growth statistics 510 for region X that can be used to predict whether the neurons in region X of the DNN are likely to process large values. The set of neuron growth statistics 510 includes the total number of input connections, the total number of non-zero inputs, the total number of non-zero weights, the average weight of the neurons, and the average output potential for neurons in region X. Based on the neuron growth statistics 510, the coarse error correction system 100 determines whether to boost voltage to the NPEs 401-403 and 405-407 (implementing the region X) in order to preempt possible transient errors.

Figure 6:
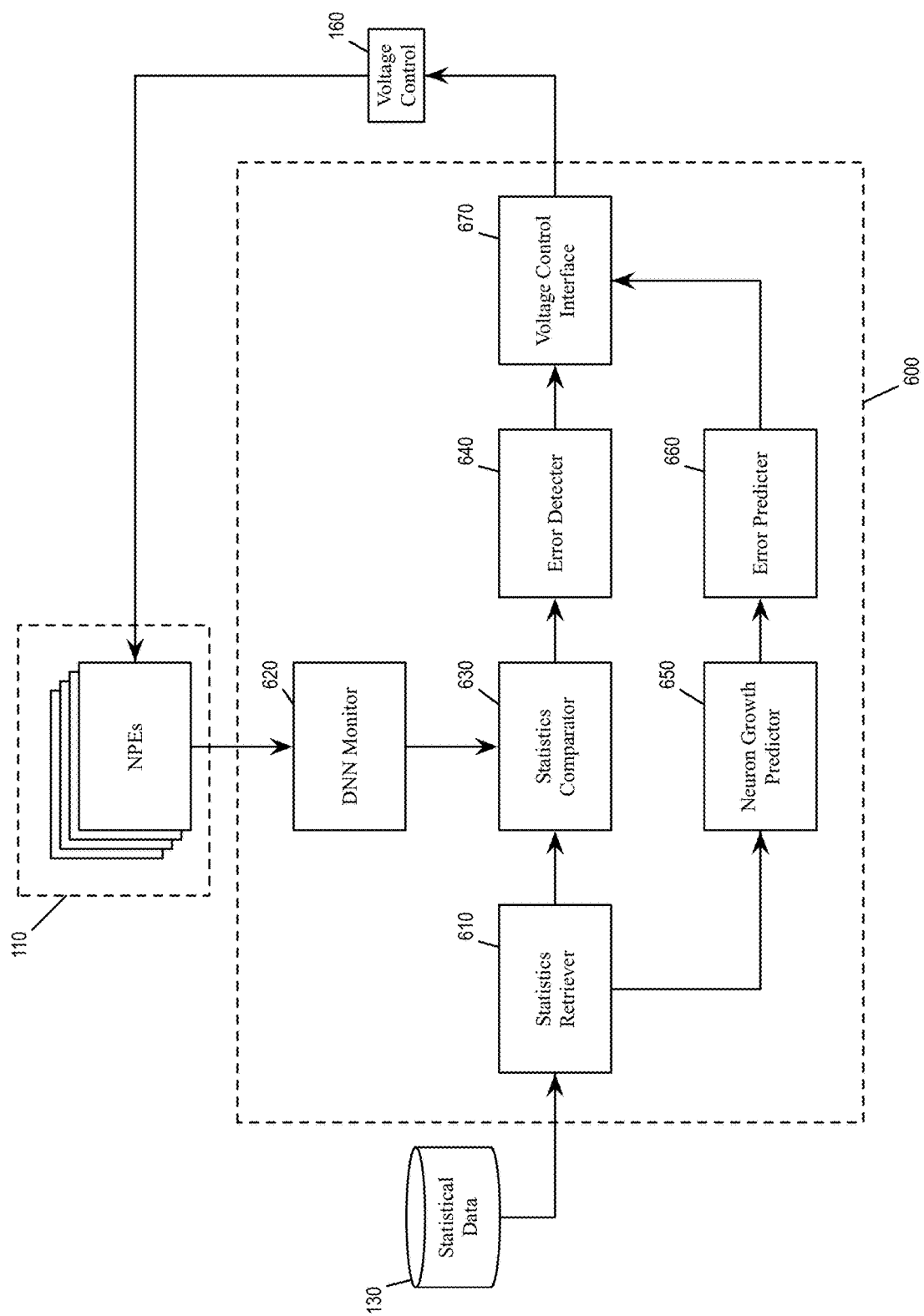
FIG. 6 illustrates a computing device that implements the coarse error correction system.

FIG. 6 illustrates a computing device 600 that implements the coarse error correction system 100, consistent with an illustrative embodiment. As illustrated, a computing device 600 implements a statistics retriever 610, a DNN monitor 620, a statistics comparator 630, an error detector 640, a neuron growth predictor 650, an error predictor 660, and a voltage control interface 670. In some embodiments, the modules 610-670 are modules of software instructions being executed by one or more processing units (e.g., a processor) of the computing device 600. In some embodiments, the modules 610-670 are modules of hardware circuits implemented by one or more integrated circuits (ICs) of an electronic apparatus. Though the modules 610, 620, 630, 640, 650, 660, 670 are illustrated as being separate modules, some of the modules can be combined into a single module. An example computing device 800 that may implement the computing device 600 will be described by reference to FIG. 8 below.

The statistics retriever 610 is a module that retrieves statistical data 130 from a storage device or from a network. The retrieved statistical data may include neuron metrics of individual neurons that are collected during the training phase of the DNN 110, such as the number of input connections of the neurons, the number of non-zero inputs in the neurons, the number of non-zero weights in the neurons, average weight of the neurons, the output potentials of the neurons, and the rate of saturation of the neuron. The statistics retriever 610 may also produce training-phase tallies or averages for a particular set of neurons based on the neuron metrics of individual neurons from statistical data 130.

The DNN monitor 620 receives instrumentation data from the NPEs that implement the DNN 110 during the run-time phase of the DNN. These instrumentation data may include the number of non-zero inputs in the neurons, the number of non-zero weights in the neurons, average weight of the neurons, the output potentials of the neurons, and the rate of saturation of the neurons. The DNN monitor 620 may also produce run-time tallies or averages for a particular set of neurons based on the instrumentation data of the DNN 110. The tallies/averages may include the total number of input connections, the total number of non-zero weights, the average weight of the neurons, the average output potential, and the average rate of saturation, etc.

The statistics comparator 630 compares the run-time data provided by the DNN monitor 620 with the training-phase data provided by the statistics retriever 610 to determine whether there is an error in the DNN 110. The error detector 640 determines whether there is an actionable error by applying a threshold value to the comparison result produced by the statistics comparator 630. The error detector 640 reports an error when the difference between the run-time data and the training-phase data is greater than a predefined threshold value.

The neuron growth predictor 650 uses the set of statistical data 130 to predict when and where transient errors may occur in the DNN 110, e.g., by identifying neurons that are more likely to process large values and therefore more likely to have transient errors in low voltage conditions. In some embodiments, the neuron growth predictor 650 predicts a range of values processed at NPEs based on statistics such as average weight, number of input connections, number of input connections with zero weights, average output potential values, etc.

The error predictor 660 determines whether the range of values predicted by the neuron growth predictor 650 is indicative of likely transient errors by comparing the predicted range of values against a predefined threshold. The error predictor 660 reports value ranges that are greater than the predefined threshold as errors.

The voltage control interface 670 receives the report of detected errors from the error detector 640 and/or predicted errors from the error predictor 660. The reported errors are used to generate control signals to the voltage control 160, which controls the voltage settings of the NPEs implementing the DNN 110. When there is no reported error from the error detector 640 and the error predictor 660, the voltage control interface 670 is configured to set the voltage settings of the NPEs at a reduced voltage setting in order to reduce power consumption.

Figure 7:
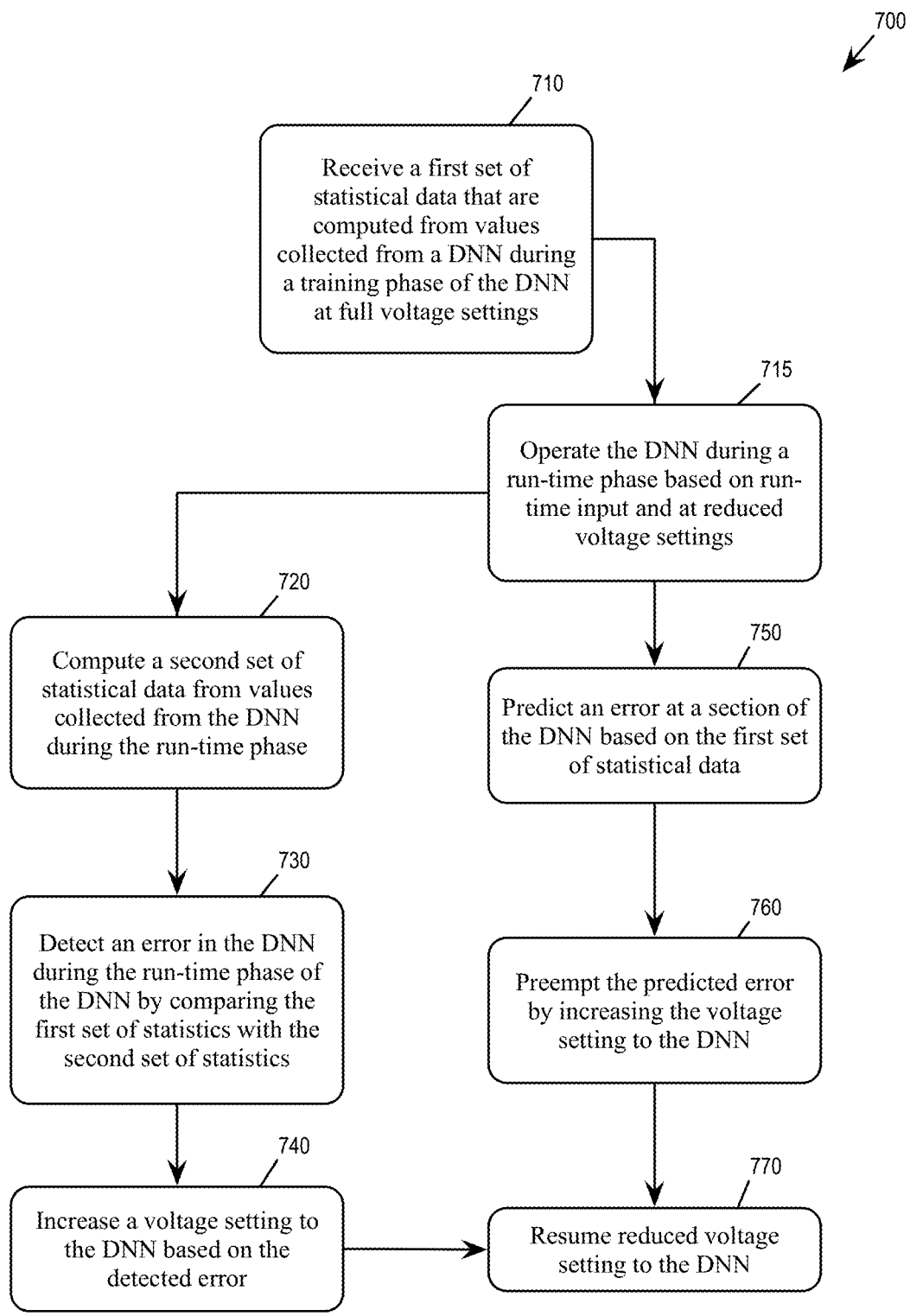
FIG. 7 conceptually illustrates a process for using training-phase statistical data to predict or detect errors in a DNN during run-time, consistent with an exemplary embodiment.

FIG. 7 conceptually illustrates a process 700 for using training-phase statistical data to predict or detect errors in a DNN during run-time, consistent with an exemplary embodiment. In some embodiments, one or more processing units (e.g., processor) of a computing device implementing the coarse error correction system 100 (e.g., the computing device 600) perform the process 700 by executing instructions stored in a computer readable medium.

The coarse error correction system 100 starts the process 700 when it receives (at 710) a first set of statistical data that are computed from values collected from the DNN during a training phase of the DNN. The first set of statistical data may be collected from NPEs that implement the neural network. The first set of statistical data are collected during the training phase of the neural network when the voltage setting to the neural network is not reduced. The first set of statistical data includes neuron metrics of individual neurons such as the number of input connections of the neurons, the number of non-zero weights in the neurons, average weight of the neurons, the output potentials of the neurons, and the rate of saturation of the neuron. The first set of statistical data may also include training-phase tallies or averages for a particular set of neurons based on the neuron metrics of individual neurons. The tallies/averages may include the total number of input connections, the total number of non-zero weights, the average weight of the neurons, the average output potential, and the average rate of saturation, etc.

The coarse error correction system 100 operates (at 715) the DNN during a run-time phase based on a run-time input. The DNN operates in reduced voltage setting to reduce power. The process then proceeds to 720 to detect errors in the DNN or to 750 to predict errors in the DNN.

At step 720, the coarse error correction system 100 computes a second set of statistical data from values collected from the neural network during the run-time phase. The collected value may include instrumentation data received from the NPEs that implement the DNN during the run-time of the DNN. The instrumentation data may include the number of non-zero weights in the neurons, the number of non-zero inputs in the neurons, the average weight of the neurons, the output potentials of the neurons, and the rate of saturation of the neurons.

The computed second set of statistical data may include run-time-phase tallies or averages that include the total number of input connections, the total number of non-zero weights, the average weight of the neurons, the average output potential, and the average rate of saturation. In some embodiments, a counter is used to count a number of neurons that saturate over an interval of time when determining the average rate of saturation. In some embodiments, the values collected from the neural network are collected from a subset of neurons in the neural network (e.g., a region of the DNN 110) but not from neurons outside of the subset.

The coarse error correction system 100 detects (at 730) an error in the DNN during run-time phase of the DNN by comparing the first set of statistics with the second set of statistics. The system may detect the error by determining whether the first set of statistical data differ with the second set of statistical data by more than a threshold.

The coarse error correction system 100 increases (at 740) the voltage setting to the DNN based on the detected error, e.g., by increasing the voltage setting of NPEs in a section of the DNN at which the error is detected. The increased voltage is based on the full voltage setting during the training phase of the DNN. The process then proceeds to 770.

At step 750, the coarse error correction system 100 predicts (at 750) an error at a section of the neural network based on the first set of statistical data (based on values collected from the DNN during the training phase). The coarse error correction system 100 uses the statistical data to predict when and where transient errors may occur in the DNN when the voltage is reduced, by e.g., identifying neurons or NPEs that are more likely to process large values and, therefore, more likely to have transient errors when the voltage setting is lower than a threshold. In some embodiments, a section of the neural network is predicted to have an error when a sum of values (e.g., weights, output potentials) in a set of neurons in the section is greater than a threshold. In some embodiments, a section of neural network is predicted to have an error when a number of non-zero elements in a set of neurons in the section is greater than a threshold.

The coarse error correction system 100 preempts (at 760) the predicted error by increasing the voltage setting to the DNN. The increased voltage is based on the full voltage setting during the training phase of the DNN. The process then proceeds to 770.

At step 770, the coarse error correction system 100 resumes the reduced voltage setting to the neural network. In some embodiments, the coarse error correction system 100 increases voltage only for a section of the neural network for which the error was predicted or detected, and only for a limited amount time. Areas of the DNN outside of the section of the predicted/detected error still operate in reduced voltage setting in order to reduce power usage.

The coarse error correction system 100 leverages the error resilience of DNNs to provide a coarse-grain error detector and/or error predictor for DNNs. The coarse error correction system uses training-phase statistical data of a DNN to predict error, detect errors, and correct errors in the DNN instead of using higher overhead approaches such as replicating hardware. This provides an inexpensive solution for deploying DNNs in low voltage applications.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 7) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
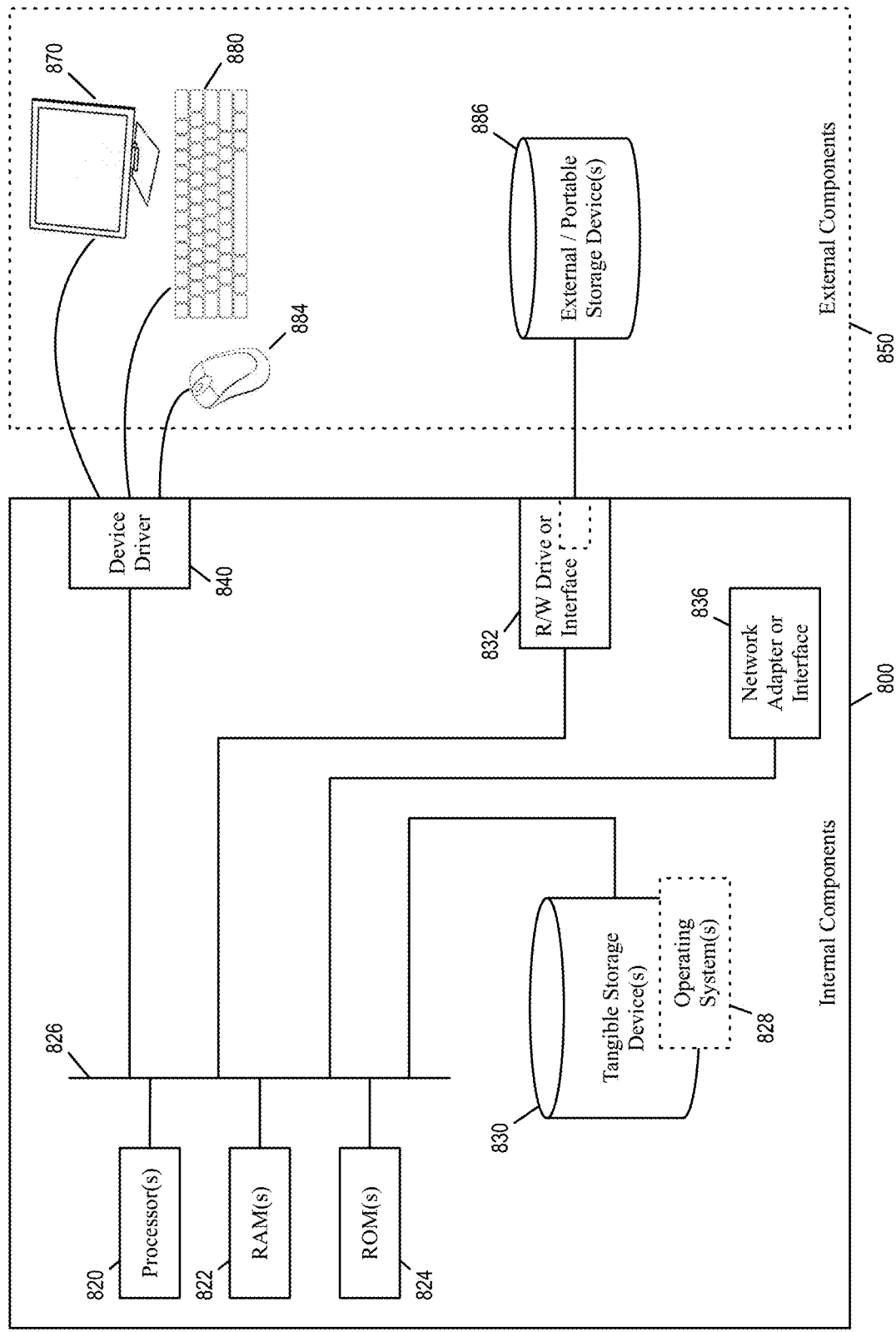
FIG. 8 shows a block diagram of the components of a data processing system in accordance with an illustrative embodiment of the present disclosure.

FIG. 8 shows a block diagram of the components of data processing systems 800 and 850 that may be used to implement the coarse error correction system 100 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing systems 800 and 850 are representative of any electronic device capable of executing machine-readable program instructions. Data processing systems 800 and 850 may be representative of a smart phone, a computer system, PDA, or other electronic devices. Examples of computing systems, environments, and/or configurations that may represented by data processing systems 800 and 850 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 800 and 850 may include a set of internal components 800 and a set of external components 850 illustrated in FIG. 8. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the process 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the process 700 can be stored on one or more of the respective portable computer-readable tangible storage devices 886, read via the respective R/W drive or interface 832 and loaded into the respective hard drive 830.

The set of internal components 800 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 850 can include a computer display monitor 870, a keyboard 880, and a computer mouse 884. The set of external components 850 can also include touch screens, virtual keyboards, touch pads, pointing devices, and other human interface devices. The set of internal components 800 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

The foregoing one or more embodiments implements the coarse error correction system within a computer infrastructure by having one or more computing devices using statistical data collected from a neural network during its training phase to detect errors or predict errors in the neural network during its run-time phase. The computer infrastructure is further used to control voltage settings to the neural network based on the predicted errors or the detected errors.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts comprising:
receiving a first set of statistics that are computed from values collected from a neural network during a training phase of the neural network;
computing a second set of statistics based on values collected from the neural network during a run-time phase of the neural network;
detecting an error in the neural network during the run-time phase of the neural network by comparing the first set of statistics with the second set of statistics; and
adjusting a voltage setting to the neural network based on the detected error, wherein the first set of statistics comprises an average saturation rate of neurons in the neural network during the training phase and the second set of statistics comprises an average saturation rate of neurons in the neural network during the run-time phase.

2. The computing device of claim 1, wherein the values collected from the neural network comprise weights and output potentials of neurons in the neural network.

3. The computing device of claim 1, wherein computing the second set of statistics comprises using a counter to count a number of neurons that saturate over an interval of time.

4. The computing device of claim 1, wherein the first set of statistics are computed from values collected from a subset of neurons in the neural network but not from neurons outside of the subset.

5. The computing device of claim 1, wherein detecting the error comprises determining whether the first set of statistics differ with the second set of statistics by more than a threshold.

6. A computer program product comprising:
one or more non-transitory computer-readable storage devices and program instructions stored on at least one of the one or more non-transitory storage devices, the program instructions executable by a processor, the program instructions comprising sets of instructions for:
receiving a set of statistics that are computed from values collected from a neural network during a training phase of the neural network;
predicting an error at a section of the neural network based on the set of statistics; and
pre-empting the error at the section of the neural network during a run-time phase of the neural network, wherein the section of neural network is predicted to have an error when a number of non-zero elements in a set of neurons is greater than a threshold.

7. The computer program product of claim 6, wherein:
the section of the neural network is predicted to have an error when a voltage setting of the neural network is lower than a threshold, and
pre-empting the error comprises increasing the voltage setting for the section of the neural network.

8. The computer program product of claim 6, wherein the section of neural network is predicted to have an error when a sum of values in a set of neurons is greater than a threshold.

9. The computer program product of claim 6, wherein the set of statistics comprises a number of input connections of each of a set of one or more neurons in the neural network.

10. The computer program product of claim 6, wherein the set of statistics comprises an average weight of each of a set of one or more neurons in the neural network.

11. The computer program product of claim 6, wherein the set of statistics comprises a number of non-zero inputs of each of a set of neurons in the neural network at a particular time instant.

12. The computer program product of claim 6, wherein the set of statistics comprises a number of non-zero weights of each of a set of neurons in the neural network at a particular time instant.

13. A computer-implemented method comprising:
  receiving a first set of statistics that are computed from values collected from a neural network during a training phase of the neural network;
  computing a second set of statistics based on values collected from the neural network during a run-time phase of the neural network;
  detecting an error in the neural network during the run-time phase of the neural network by comparing the first set of statistics with the second set of statistics; and
  adjusting a voltage setting to the neural network based on the detected error, wherein the first set of statistics comprises an average saturation rate of neurons in the neural network during the training phase and the second set of statistics comprises an average saturation rate of neurons in the neural network during the run-time phase.

14. The computer-implemented method of claim 13, wherein the values collected from the neural network comprises weights and output potentials of neurons in the neural network.

15. The computer-implemented method of claim 13, wherein computing the second set of statistics comprises using a counter to count a number of neurons that saturate over an interval of time.

* * * * *